United States Patent [19]
Driessen et al.

[11] Patent Number: 5,997,799
[45] Date of Patent: *Dec. 7, 1999

[54] METHOD FOR INJECTION-MOULDING A HOLLOW PRODUCT USING A PRESSURE VARIATION BETWEEN TWO GAS VOLUMES

[75] Inventors: Marcellis H. J. Driessen; Willem Lock, both of Eindhoven, Netherlands

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/592,260

[22] Filed: Jan. 26, 1996

[30] Foreign Application Priority Data

Jan. 27, 1995 [EP] European Pat. Off. ............... 95200198

[51] Int. Cl.⁶ ................................................... B29C 45/00
[52] U.S. Cl. ........................................... 264/572; 425/130
[58] Field of Search ............................... 264/572; 425/130

[56] References Cited

U.S. PATENT DOCUMENTS

| | | | |
|---|---|---|---|
| 5,069,858 | 12/1991 | Hendry | 264/572 |
| 5,098,637 | 3/1992 | Hendry | 264/328.12 |
| 5,204,050 | 4/1993 | Loren | 264/504 |
| 5,324,189 | 6/1994 | Hendry | 264/572 |
| 5,482,669 | 1/1996 | Shah | 425/130 |
| 5,612,067 | 3/1997 | Kurihara et al. | 264/572 |

FOREIGN PATENT DOCUMENTS

| | | | |
|---|---|---|---|
| 3-121820 | 5/1991 | Japan | 264/572 |
| WO 94/08773 | 4/1994 | WIPO . | |

*Primary Examiner*—Catherine Timm
*Attorney, Agent, or Firm*—Steven R. Biren

[57] ABSTRACT

A method is described for injection-moulding a product by means of the so-called gas-injection method. A special feature of the method is that in addition to the injection of gas into the product cavity (10) via a first gas inlet (51), gas is injected into a spill cavity (20) via a second gas inlet (52). The amount of material (1) flowing from and toward the spill cavity (20) can be controlled by the location of the second gas inlet (52). Moreover, a variant of the method prevents the formation of so-called dead ends. By means of another variant of the method in accordance with the invention it is possible to prevent the occurrence of so-called flow lines.

1 Claim, 6 Drawing Sheets

METHOD FOR INJECTION-MOULDING A HOLLOW PRODUCT USING A PRESSURE VARIATION BETWEEN TWO GAS VOLUMES

BACKGROUND OF THE INVENTION

The invention relates to a method for injection-moulding a product, including the steps of: injecting an amount of a liquid material into a mould having a product cavity defining the contours of the product and having a spill cavity, which is in open communication with the product cavity by means of a channel, forming a first gas volume in the product cavity and a second gas volume in the mould by injecting gas via a first gas inlet and a second gas inlet, respectively, which first gas inlet is in communication with the product cavity, allowing the liquid material in the product cavity to solidify, and removing the product from the product cavity.

The invention also relates to a mould for the injection-moulding of a product, which mould has a product cavity defining the contours of the product and having a spill cavity, which is in open communication with the product cavity by means of a channel, a first gas inlet and a second gas inlet for injecting gas, which first gas inlet is in communication with the product cavity.

The invention also relates to a product manufactured by said method.

The invention also relates to a method for injection-moulding a product, including the steps of: injecting an amount of a liquid material into a mould having a product cavity defining the contours of the product, forming a first gas volume and a second gas volume in the product cavity by injecting gas via a first gas inlet and a second gas inlet, respectively, which first and second gas inlet are in communication with the product cavity, allowing the liquid material in the product cavity to solidify, and removing the product from the product cavity.

Such a method, such a mould and such a product are known from U.S. Pat. No. 5,098,637. Said Patent Specification describes the injection-moulding of a hollow product. In accordance with the method described therein a hot and consequently liquid plastic is injected into a product cavity, after which gas is injected into the product cavity via a first and a second gas inlet, which inlets terminate in the product cavity. The injection of gas via two gas inlets results in two gas volumes which are separated by a volume of liquid plastic. The gas urges a part of the liquid plastic into a spill cavity, resulting in two voids in the product, which voids are separated by a plastic wall. Finally, the plastic solidifies by cooling, after which the product is taken out of the product cavity and the plastic stemming from the spill cavity is removed. The volume of the spill cavity is adjusted by means of a set-screw prior to moulding. However, a drawback of this method is the absence of an adjustment possibility during injection-moulding.

SUMMARY OF THE INVENTION

It is an object of the invention to provide a method and a mould by means of which it is possible to control the distribution of a quantity of material injected into the mould between the product cavity and the spill cavity.

To this end the method in accordance with the invention is characterised in that gas is injected into the spill cavity via the second gas inlet, which terminates in the spill cavity. The quantity of material which can be present in the spill cavity is limited by injecting gas into the spill cavity. By controlling this gas injection the distribution of the material injected into the mould between the product cavity and the spill cavity is controlled during injection-moulding.

It is to be noted that the injection of gas into a spill cavity is known per se from U.S. Pat. No. 3,044,118. Said Patent Specification describes the manufacture of a product formed by injecting a hot and consequently liquid plastic into a product cavity and subsequently allowing it to solidify by cooling. During cooling the plastic shrinks, as a result of which the volume of the plastic decreases. To supply the plastic to the product cavity the product cavity is in open communication with a spill cavity, which is also filled with the liquid plastic. After the injection of the plastic gas is injected into the spill cavity, which gas urges plastic from the spill cavity to the product cavity, in order to compensate for the volume reduction of the plastic in the product cavity. The material stream from the spill cavity to the product cavity is depends on the shrinkage of the plastic in the product cavity and is consequently not controlled.

Moreover, it is to be noted that the formation of a hollow space in an injection-moulded product by gas injection into a spill cavity is known from U.S. Pat. No. 5,069,859. In the injection-moulding method described in said Patent Specification the injection of gas into the product cavity and the spill cavity is not combined and therefore no control is possible of the material distribution between the product cavity and the spill cavity.

A variant of the method in accordance with the invention is characterised in that the injection of gas via the first gas inlet begins at another instant than the injection of gas via the second gas inlet. By providing a difference in time between the injection of gas via the first and the second gas inlet it is possible to control the ratio between the contents of the two gas volumes. In a first phase the gas injected first via one of the two gas inlets will comparatively rapidly form a volume having a content equal to the difference between the volume of the cavities together and the volume of the material in the cavities. In a second phase the content of this gas volume will increase comparatively slowly in that the material shrinks as a result of cooling. During theses phases the still liquid material is displaced by the gas. At the instant that gas is injected via the other gas inlet a next gas volume will be formed. The content of this next gas volume depends on the space which becomes yet available by displacement and shrinkage of the material and consequently depends on the time interval between the first and the second gas injection.

A variant of the method in accordance with the invention is characterised in that a pressure difference is established between the gas volumes. Between the gas volumes an amount of liquid material will be present which tends to move toward the gas volume having the lower pressure. This enables the displacement of material from and toward the spill cavity to be controlled by controlling the pressure in the two gas volumes. In this way it is possible to avoid solid thick product portions and, as a consequence, sink marks. By avoiding the formation of solid portions in the product a faster cooling of the product is achieved. Moreover, the still liquid material can be urged to a product location requiring a solid filling for additional strength at this location. It is even possible to drive the still liquid material to and fro between the gas inlets by continually reversing the sign of the pressure difference. A thin layer of material will then each time settle on the already solidified wall of the hollow space in the product. Thus, nearly all the liquid material will eventually be spread over this wall.

A variant of the method in accordance with the invention is characterised in that material is urged into the spill cavity via a channel connected near a dead-end zone of the product cavity. When gas is injected into the product cavity the gas cannot displace the liquid material in a dead-end zone of the mould. After solidification of this liquid material this results in a solid part known as a "dead end" being formed in the product. A dead end has the disadvantage that sink marks may be formed at the product surface owing to shrinkage of the solid part. Moreover, a solid part requires a longer cooling time, resulting in a comparatively long cycle time of a moulding. By connecting the dead-end zone to a spill cavity the excess liquid material can be urged almost completely into this spill cavity. The advantage of the method in accordance with the invention is that by injecting gas into the spill cavity the amount of material flowing into the spill cavity can be controlled in such a manner that the amount of material urged out of the product cavity is just adequate and that this is effected at the correct instant. This process can be controlled in such a manner that the channel between the product cavity and the spill cavity remains always completely filled with material. This is an advantage because if the gas also penetrates the channel, as for example in the case of the method described in the afore-mentioned Patent U.S. Pat. No. 5,069,859, a hole is formed in the product upon removal of the material which has solidified in the channel.

A variant of the method in accordance with the invention is characterised in that material is urged into the spill cavity via a channel connected near a location in the product cavity where two streams of liquid material meet. In the case that a large number of product shapes are desired there will be locations in the product cavity where two streams of material, which have each followed a different path, meet. The interface between these material streams sometimes remains visible in the product as a so-called flow line because the contour of the product does not entirely correspond to that of the wall of the product cavity. Moreover, a flow line forms a weak link between two product portions. Particularly if the flow line is situated in a thin wall of the product the product is liable to break at the location of the flow line. The above measures preclude the formation of such flow lines. At the location where the material streams meet part of the material streams into the spill cavity, resulting in a satisfactory blending of the two material streams. This blending counteracts the formation of flow lines and results in a stronger product.

The channel interconnecting the product cavity and the spill cavity preferably has a small cross-sectional dimension in at least one direction. This promotes the blending of the material streams and enables the product, after removal from the product cavity, to be easily severed from the material shaped by the channel and the spill cavity.

A variant of the method in accordance with the invention is characterised in that the pressure of the second gas volume during a first period is arranged to be lower than and during a second period is arranged to be at least equal to the pressure in the first gas volume. Owing to these measures the material is urged into the spill cavity during the first period. During the second period material streams back from the spill cavity into the product cavity owing to the difference in pressure of the gas in the spill cavity and the gas in the product cavity. In the case of equal pressures there will already be a reflux of material to the product cavity owing to shrinkage of the material in the product cavity as a result of cooling. The reflux of material to the product cavity further mitigates the formation of sink marks. This reflux is promoted by making the pressure in the spill cavity in the second period higher than the pressure in the product cavity. In the case that the channel to the spill cavity adjoins the product cavity at a location where two streams of liquid material meet this will promote the mixture of the material streams.

The mould in accordance with the invention is characterised in that the second gas inlet for the injection of gas terminates in the spill cavity. This mould is suitable for use in conjunction with the method in accordance with the invention.

An embodiment of the mould in accordance with the invention is characterised in that the channel is connected to the product cavity near a dead-end zone of the product cavity.

A variant of the method in accordance with the invention is characterised in that an alternating pressure difference is applied between the gas volumes such that the magnitude of the gas volumes alternately increases and decreases. It is also possible to drive the still liquid material to and fro between two gas inlets by alternately reversing the sign of the pressure difference if both gas inlets terminate in the product cavity at some distance from one another. A thin layer of the still liquid material will then each time settle on the already solidified wall of the hollow space in the product. Thus, the liquid material will ultimately be spread over this wall so that one hollow space is formed.

It is to be noted that the embodiments are shown diagrammatically and the Figures are shown to an arbitrary scale, which is not always the same.

DESCRIPTION OF THE PREFERRED EMBODIMENTS

Figure 1:
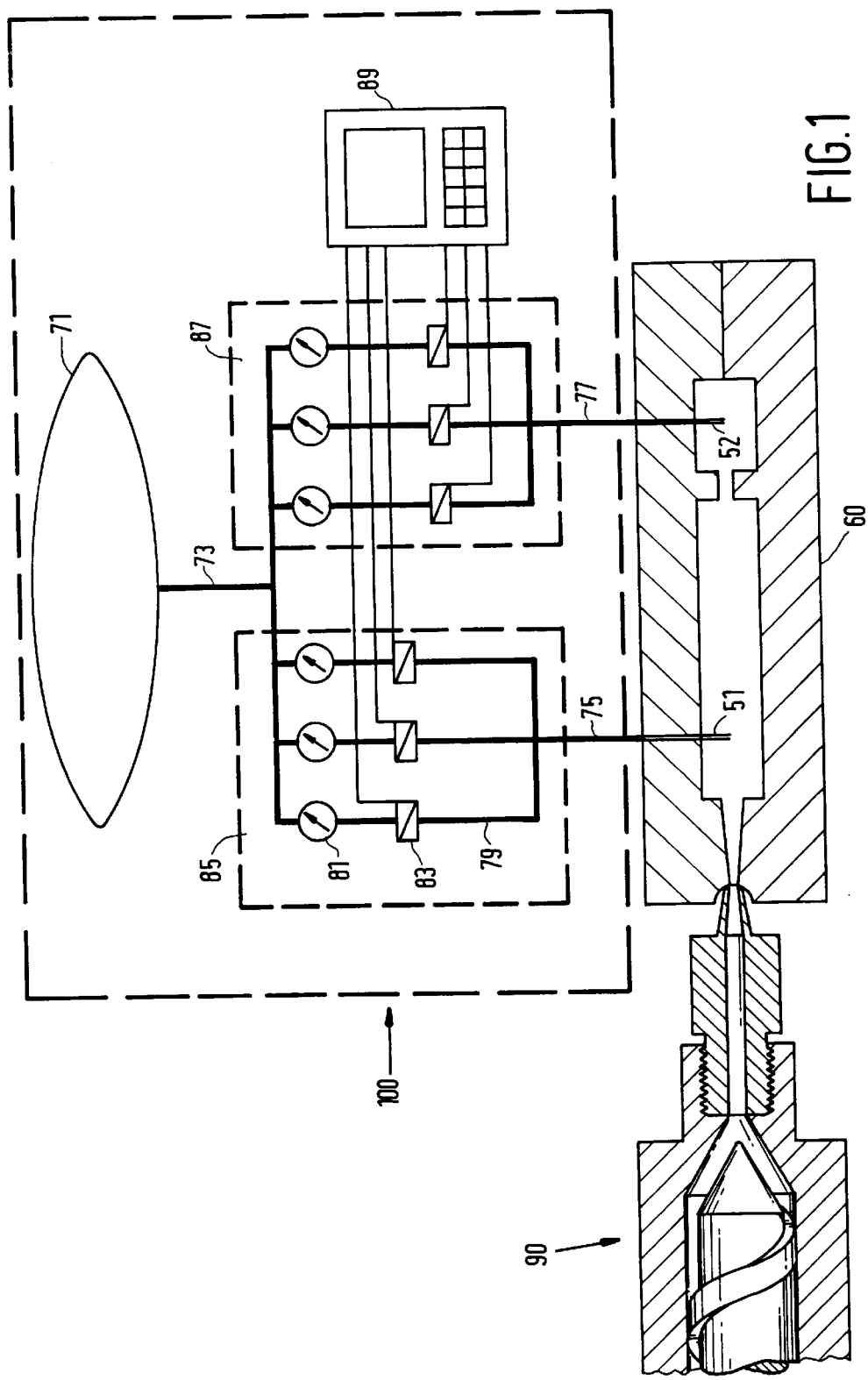
FIG. 1 shows a cross-sectional view of an injection-moulding plant for carrying out the method in accordance with the invention.

FIG. 1 shows an injection-moulding plant for carrying out the method in accordance with the invention. The injection-moulding arrangement includes a gas supply arrangement 100, a mould 60, and a material supply arrangement 90, which is known per se. The gas supply arrangement 100 comprises a gas supply channel 73, which is connected to a first gas outlet 75 via a first gas control means 85 and to a second gas outlet 77 via a second gas control means 87. By means of this gas supply arrangement 100 gas from a supply vessel 71 connected to the gas supply channel 73 can be injected into a mould 60 via the gas outlets 75 and 77 and the gas inlets 51 and 52. The gas control means 85 and 87 include a plurality of parallel channels 79, which each have a pressure regulator 81 and an electrically controllable valve 83 by which the channels 79 can be closed. The pressure regulators 81 have a vent to bleed gas to the environment in order to allow the pressure to be reduced. By setting each of the pressure regulators 81 to a different value the pressure of a gas volume connected to the associated gas outlet can be adjusted to one of the preset values by opening one of the valves 83 and closing the other valves 83. To control the valves 83 the gas supply arrangement 100 comprises a control unit 89. This control unit 89 is constructed so as to enable at least two gas control means 85 and 87 to be controlled in accordance with a preset program.

Figure 2:
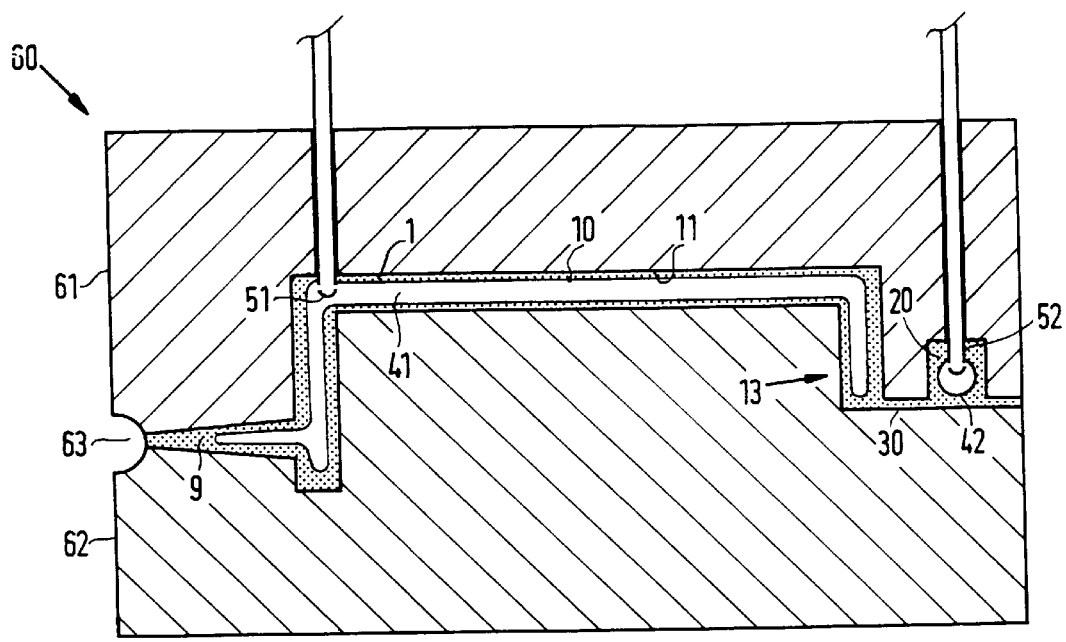
FIG. 2 shows a cross-sectional view of an embodiment of the mould in accordance with the invention during use of a variant of the method in accordance with the invention, FIG. 3 gives an example of the selected pressure as a function of time in the process of a method in accordance with the invention.

FIG. 2 is a cross-sectional view showing a mould 60 in accordance with the invention. The mould 60 comprises an upper mould section 61 and a lower mould section 62, in which a product cavity 10 and a spill cavity 20 are formed. The spill cavity 20 is in open communication with the product cavity 10 by means of a channel 30. A hot and consequently liquid material, in the present case a plastic 1, is injected into the mould 60 via a gate 63 and a sprue channel 9. The mould 60 has a first gas inlet 51, which opens into the product cavity 10. The mould 60 further has a second gas inlet 52, which opens into the spill cavity 20. In the product cavity 10 a gas volume 41 is formed by injecting gas via the first gas inlet 51. In the spill cavity 20 a second gas volume 42 is formed by gas injection via the second gas inlet 52. The material 1 at the wall 11 of the product cavity 10 cools rapidly by the contact with the wall 11. As a result of this cooling, the material near the wall 11 solidifies. The material in the central area of the product cavity 10 remains liquid for some time because its heat has to be carried off via the material 1 adjoining the wall 11. The still liquid material in the central area of the product cavity 10 is readily displaced by the gas injected via the first gas inlet 51. This results in a first gas volume 41, which forms a hollow space in the central part of the product. The content of the gas volume 41 depends on the amount of material 1 injected into the mould 60 and on the shrinkage of the material 1 during cooling. In a variant of the method in accordance with the invention the gas is injected simultaneously via the first gas inlet 51 and the second gas inlet 52. The gas injection via the first gas inlet 51 is effected with a higher pressure than the gas injection via the second gas inlet 52. Since the pressure in the first gas volume 41 is higher than in the second gas volume 42 at least a part of the liquid material between the two gas volumes is urged into the spill cavity 20. After a given time the pressure in the gas volume 42 is equalized to the pressure in the first gas volume 41. When the pressure in the two gas volumes is equal the volume of liquid material is no longer displaced. The amount of material flowing into the spill cavity 20 is determined by the pressure difference between the gas volumes 41 and 42 and the time during which this pressure difference is sustained. The material stream from and toward the spill cavity 20 can be controlled by varying this pressure difference and this period of time.

In the example shown in FIG. 2 the channel 30 is connected to the product cavity 10 near a dead-end zone 13 of the product cavity. If the gas volume 41 does not extend entirely into the dead-end zone 13 of the product cavity 10 a solid portion is formed. Such a solid portion requires a longer cooling time. As a result, the time during which the product should remain in the mould 60 increases, so that the production costs of the product increase. Another disadvantage of a such a solid portion is that during cooling the material 1 may locally become detached from the wall 11 of the product cavity 10 as a result of material shrinkage. This gives rise to so called sink marks. A sink mark is a product area where the surface has sunk relative to other parts of the surface. Such a sink mark is very well visible and leads to a poor surface quality of the product. Such sink marks do not occur in the hollow parts of the product because the gas pushes the material 1 against the wall 11 of the product cavity 10. The measures in accordance with the invention enable the amount of material 1 flowing into the spill cavity 20 to be controlled exactly in such a way that the first gas volume 41 extends into the dead-end zone 13 of the product cavity 10.

Figure 3:
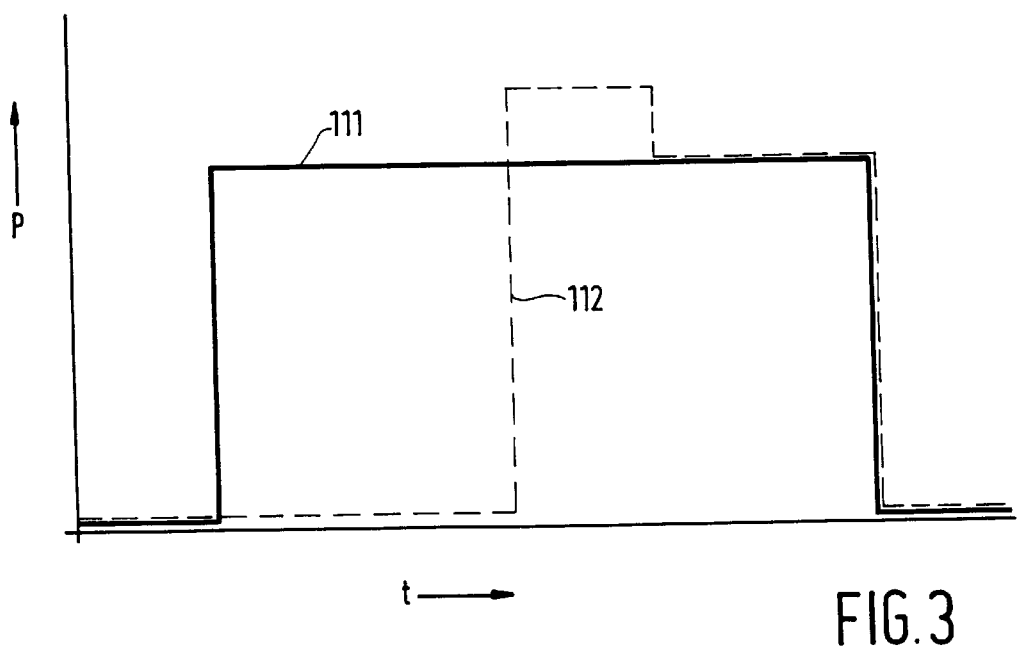

FIG. 3 shows an example of the pressure selected for the first gas volume 41 and the second gas volume 42 as a function of time in the process of a method in accordance with the invention. The pressure in the first gas volume 41 bears is referenced 111 and the pressure in the second gas volume 42 is referenced 112. As a result of these measures, material is urged into the spill cavity 20 during a first period in the formation of the first gas volume 41 (see FIG. 2). During a second period material is urged back from the spill cavity 20 into the product cavity 10 in that the pressure of the gas in the second gas volume 42 is made higher than the pressure in the first gas volume 41. Urging the material back into the product cavity 10 further helps to prevent the occurrence of sink marks.

Figure 4:
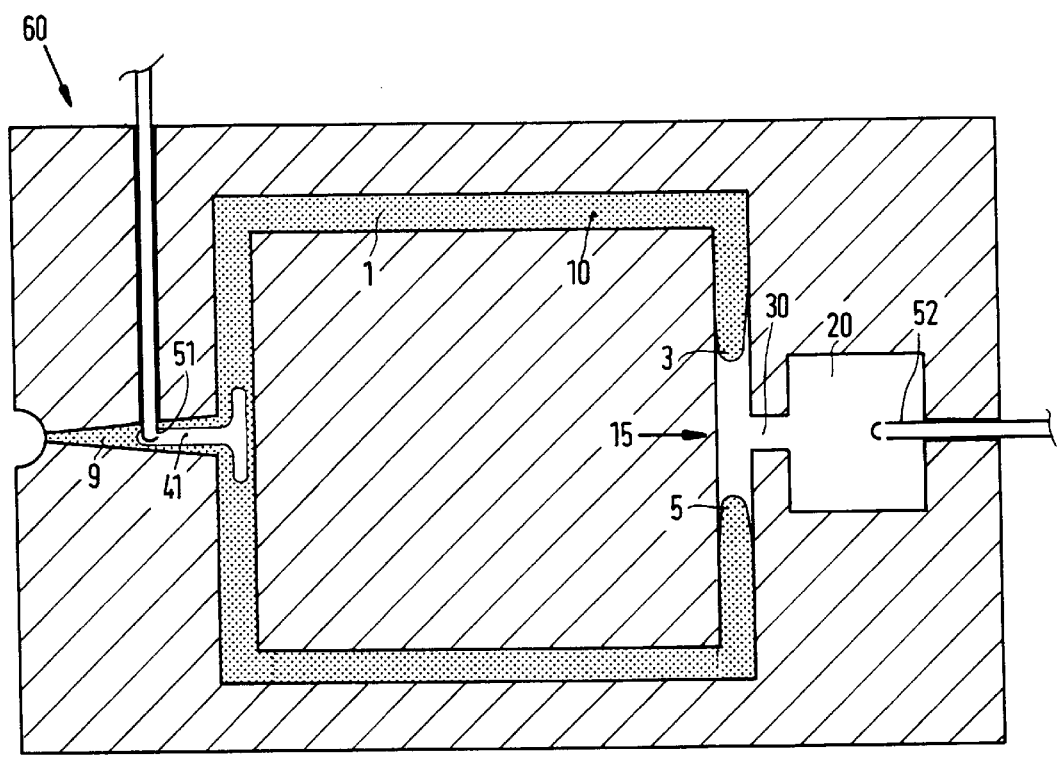
FIG. 4 shows a cross-sectional view of another embodiment of the mould in accordance with the invention in another variant of the method in accordance with the invention.

FIG. 4 shows another embodiment of a mould 60 in accordance with the invention during a first step of another variant of the method in accordance with the invention. In this first step material 1 is injected to the product cavity 10. The shape of the product cavity 10 is such that the material is split into two material streams bounded by stream fronts 3 and 5. Moreover, the product cavity 10 has such a shape that the stream fronts 3 and 5 of the two streams of material meet at a location 15 in the product cavity 10. At this location 15 a channel 30 is connected to the product cavity 10, which channel 10 connects the product cavity 10 to a spill cavity 20. The mould 60 has a first gas inlet 51, which is situated in the sprue channel 9 and which terminates in the product cavity 10 via this sprue channel.

Figure 5:
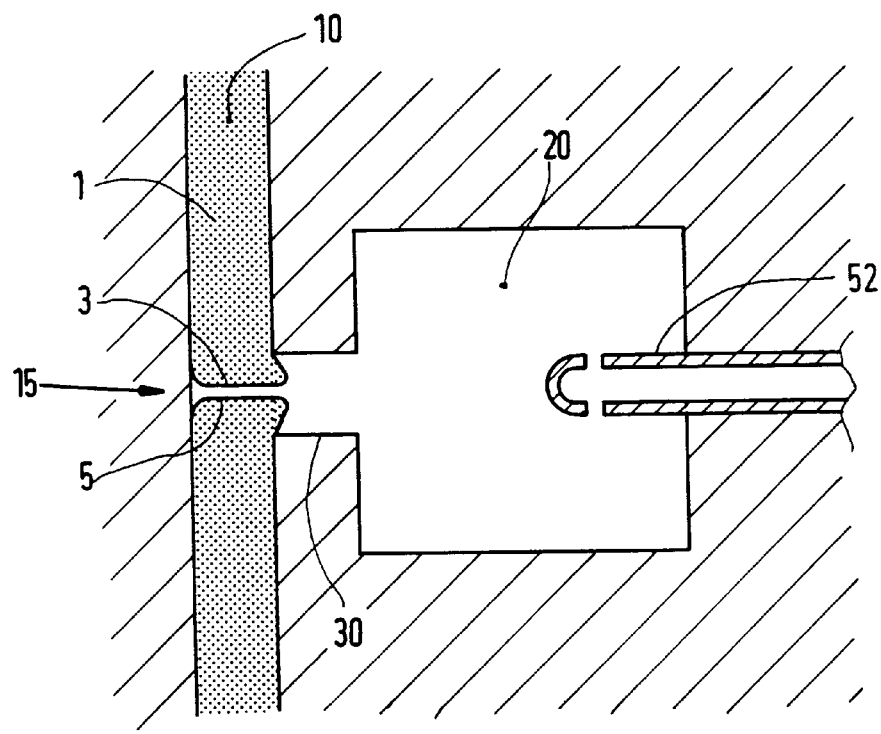
FIG. 5 shows a cross-sectional view of a part of the mould shown in FIG. 4 during a first step of a variant of the method in accordance with the invention.

FIG. 5 shows a part of the mould 60 of FIG. 4. The stream front 3 and the stream front 5 collide at the location 15. In the absence of the channel 30 connecting the product cavity 10 to the spill cavity 20, the two material streams would not blend properly. This would result in a so-called flow line at the location 15. Such a flow line is visible at the product surface and gives the impression of poor quality. Moreover, the product is more likely to break at the location of the flow line because the molecules of the material are not cross-linked beyond the flow line.

Figure 6:
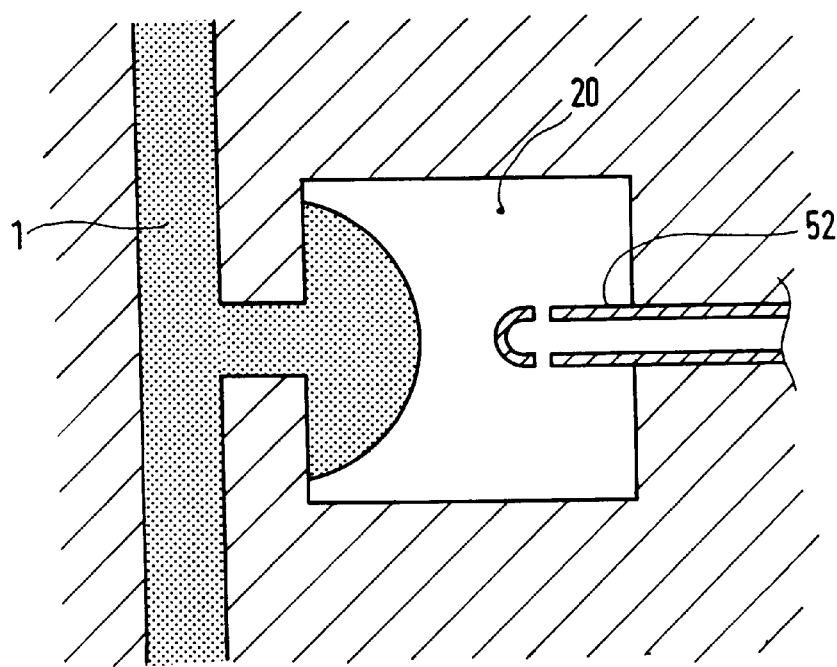
FIG. 6 shows a cross-sectional view of a detail of FIG. 4 during a second step of a variant of the method in accordance with the invention.

FIG. 6 shows the same part as FIG. 5 but now during a second step of the variant of the method in accordance with the invention. The material streams reach the spill cavity 20 in that the channel 30 is arranged at the location where the material streams meet.

Figure 7:
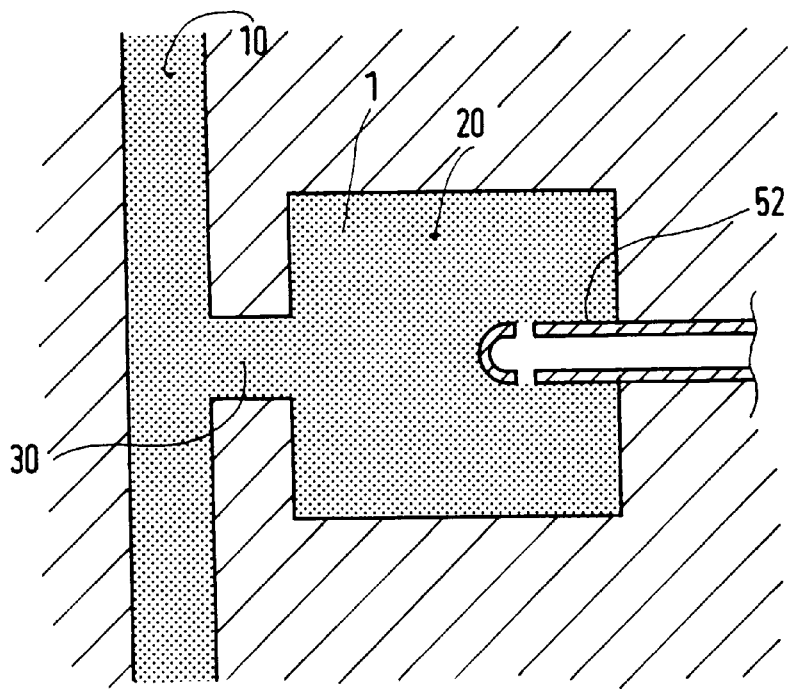
FIG. 7 shows a cross-sectional view of a detail of FIG. 4 during a third step of a variant of the method in accordance with the invention.

FIG. 7 shows the same part as FIGS. 5 and 6 in a third step of the variant of the method in accordance with the invention. In this step the spill cavity 20 is wholly filled with the material 1. The two material streams have blended with one another during filling of the spill cavity 20. The gas inlet 52 is arranged in such a manner that in the case of a filled spill cavity 20 it is wholly surrounded with the material 1. This minimises the risk of breakthrough of the gas, in which case gas would leak away to the environment. If the spill cavity 20 is not yet filled completely with material 1 at the instant that gas is injected into the spill cavity there will be a risk that the gas breaks through the material and leaks away through an opening in the mould 60, so that the pressure does not remain at the required level. Owing to said measure the spill cavity 20 is properly filled with the material 1, so that an opening is closed by a layer of material, which is correctly supported at all sides by the cavity walls. The material is far more viscous than the gas and therefore cannot rapidly escape through a gap. The gas is thus trapped by the material.

Figure 8:
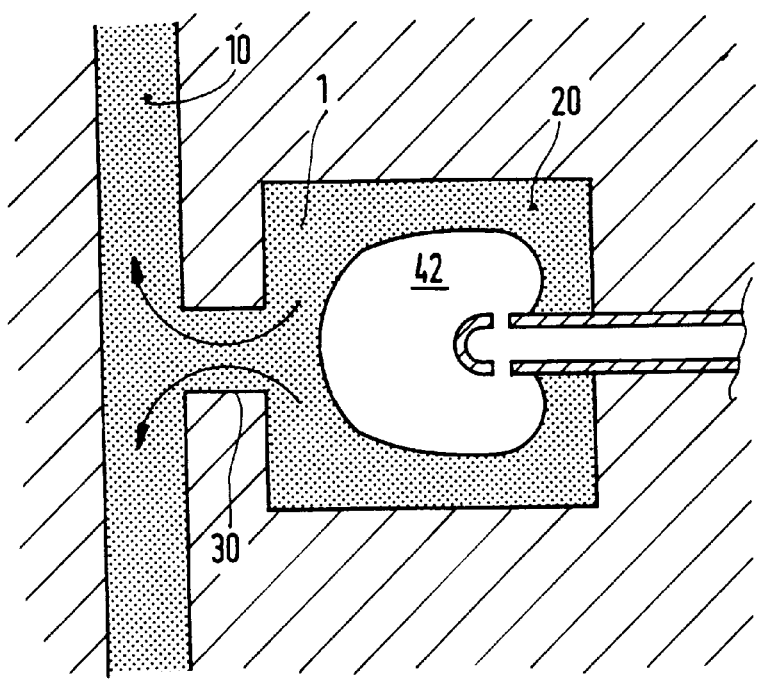
FIG. 8 shows a detail of FIG. 4 during a fourth step of a variant of the method in accordance with the invention.

FIG. 8 shows the same part as FIGS. 5, 6 and 7 in a fourth step of a variant of the method in accordance with the invention. In the fourth step gas is injected into the spill cavity 20 via the second gas inlet 52 with a higher pressure than that in the product cavity 10. As a result, a gas volume 42 is formed and the material 11 is the spill cavity 20 is partly urged back into the product cavity 10 via the channel 30. This urging back ensures an even better blending of the streams of material, thereby preventing the formation of flow lines. Moreover, urging back of the material compensates for shrinkage of the material in the product cavity 10.

Figure 9:
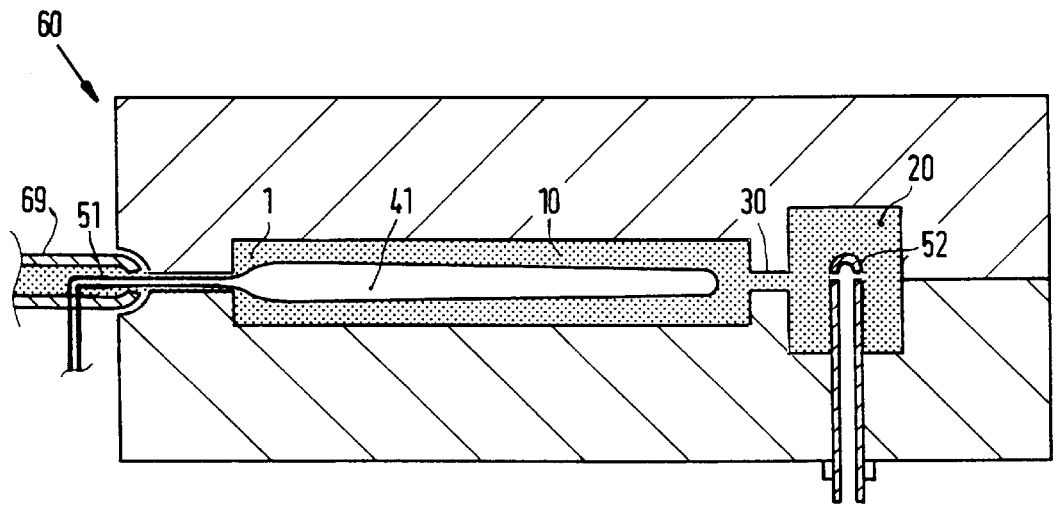
FIG. 9 shows another embodiment of the mould in accordance with the invention during use of a further variant of the method in accordance with the invention.

FIG. 9 shows a further embodiment of a mould 60 in accordance with the invention in the process of a further variant of the method in accordance with the invention. The mould 60 has a product cavity 10 and a spill cavity 20 which are in open communication with one another by means of a channel 30. The product cavity 10 is filled with a liquid material 1 for 95% via an injection nozzle 69. Subsequently, gas is injected via the first gas inlet 51, which is inserted into the injection nozzle 69, in order to form a first gas volume 41 in the product cavity. The pressure at the second gas inlet 52, which is inserted in the spill cavity, is smaller than that at the first gas inlet. The displacement of the still liquid material in the spill cavity 20 is controlled by controlling the pressure difference.

Figure 10:
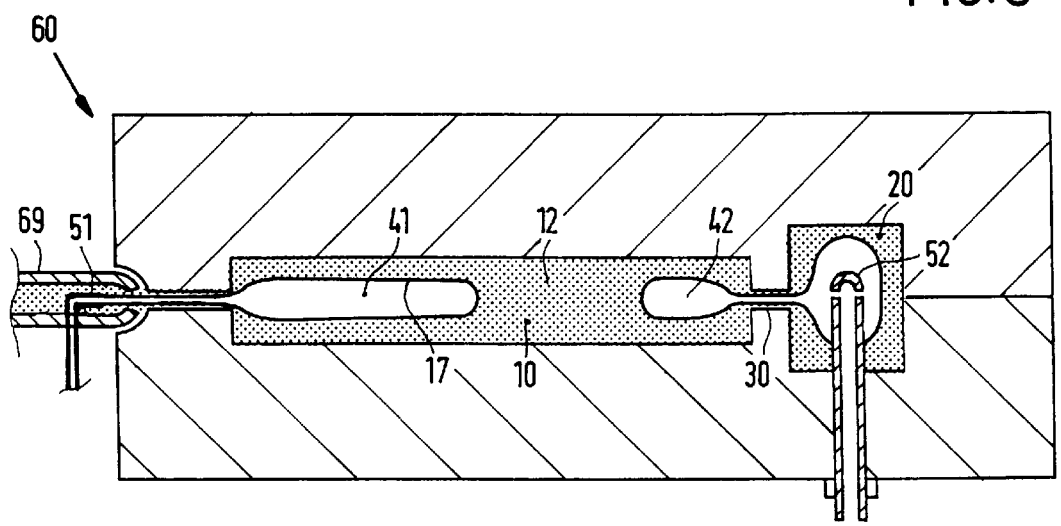
FIG. 10 shows the mould of FIG. 9 during a second step of the further variant of the method in accordance with the invention.

FIG. 10 shows the mould of FIG. 9 during a subsequent step of the variant of the method in accordance with the invention. In this subsequent step gas is injected into the spill cavity 20 via the second gas inlet 52 with a pressure higher than that existing in the first gas volume 41. This results in a second gas volume 42, which is separated from the first gas volume 41 by a volume of liquid material 12. By making the pressure in the second gas volume 42 higher than the pressure in the first gas volume 41 for some time the second gas volume 42 will extend into the product cavity 10. As a result, the still liquid material 12 will be driven to a location where the product requires a solid filling in order to obtain additional strength at this location. It is even possible to urge the still liquid material to and fro by alternately reversing the sign of the pressure difference between the gas volumes 41 and 42. A thin layer of material will then each time settle on the already solidified wall 17 of the hollow space in the product, so that the amount of liquid material 12 decreases. Eventually, the residual liquid material 12 can then be urged into the spill cavity 20 by making the pressure in the first gas volume 41 higher than the pressure in the second gas volume 42. This last variant of the method in accordance with the invention then provides an entirely hollow product for which the amount of material ultimately left behind in the spill cavity 20 is limited. This limitation allows the material in the spill cavity 20 to cool comparatively rapidly and less waste material is produced in comparison with a method in which the entire spill cavity is filled with material. Indeed, the material which solidifies in the spill cavity 20 is removed from the product and should therefore be regarded as waste.

Several other modifications are conceivable within the scope of the invention. For example, the mould 60 may have a plurality of spill cavities 20. Moreover, advantages of the invention can also be gained with embodiments in which the second gas inlet 52 terminates directly in the product cavity 10. In addition, the invention can also be used in injection-moulding or die-casting processes where the material 1 consists of a metal, a synthetic material filled with metal particles, or metal alloys.

We claim:

1. A method for injection-moulding a product, including the steps of:

providing an injection mould (60) having a product cavity (10) and a spill cavity (20) in communication with the product cavity (10);

providing a first gas inlet (51) for introducing gas into the product cavity (10) and a second gas inlet (52) for introducing gas into the spill cavity (20);

injecting an amount of a liquid material (1) into said mould (60);

introducing gas via said first gas inlet (51) into the liquid material (1) at a predetermined pressure to urge liquid material from the product cavity (10) into the spill cavity (20) and thereby form a first gas volume (41) within said liquid material (1) in the product cavity (10);

introducing gas via said second gas inlet (52) into the liquid material within the spill cavity (20) to form a second gas volume (42);

applying a pressure difference between the gas volumes (41, 42) such that during a time period when the pressure in said first gas volume (41) is substantially constant, the pressure in said second gas volume (42) is first less than the pressure in said first gas volume (41) to allow liquid material in the product cavity (10) to be urged toward the spill cavity (20), then greater than the pressure in said first gas volume (41) to urge liquid material back into the product cavity (10) from the spill cavity (20), and then substantially equal to the pressure in said first gas volume (41); then allowing the liquid material in the product cavity (10) to solidify; and then removing the product from the product cavity (10).

* * * * *